Nov. 6, 1928.  1,690,954
E. SPENCER
PROCESS FOR THE EXTRACTION OF CELLULOSE OR PAPER PULP FROM
FIBROUS VEGETABLE MATTER CONTAINING THE SAME
Filed Feb. 10, 1928
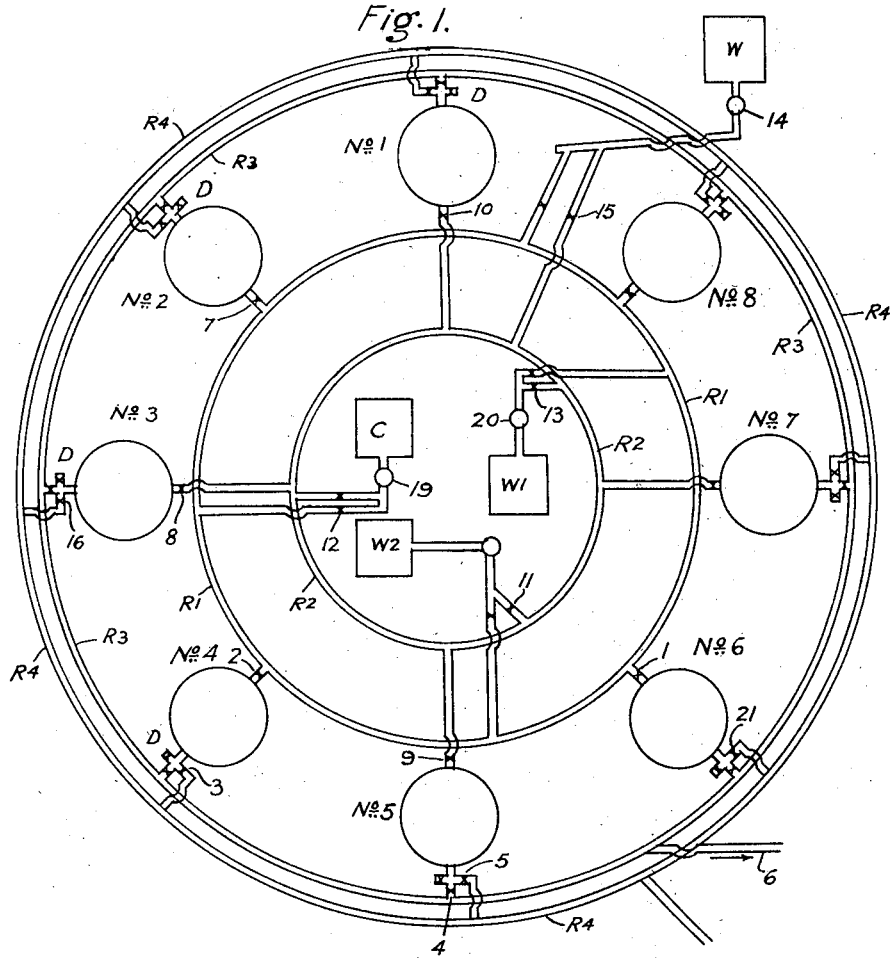
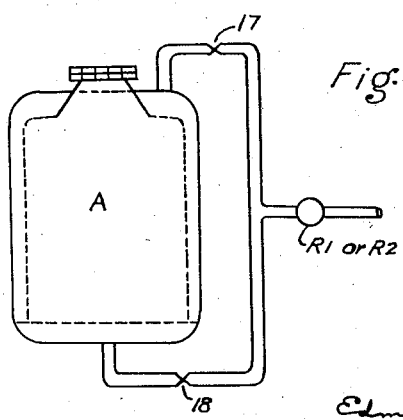

Patented Nov. 6, 1928.

1,690,954

UNITED STATES PATENT OFFICE.

EDMONDSON SPENCER, OF CALCUTTA, BRITISH INDIA.

PROCESS FOR THE EXTRACTION OF CELLULOSE OR PAPER PULP FROM FIBROUS VEGETABLE MATTER CONTAINING THE SAME.

Application filed February 10, 1928, Serial No. 253,309, and in British India January 20, 1927.

This invention relates to an improved process for separating or extracting cellulose or paper-pulp from bamboo, wood, grasses, reeds or other suitable fibre-yielding vegetable material wherein the said material is treated in digesters with caustic or other digesting liquors.

It is known to use a process for the extraction of cellulose or paper pulp from fibrous vegetable material wherein a fractional separation of the soluble or non-cellulose substances is employed, and according to which the said solubles are classified into groups or divisions according to their different solubilities and are dissolved or separated one group at a time. In said process it is known to first dissolve or separate the group or division which can be most easily dissolved, then the group next most easily dissolved, and so on in the ascending scale of difficulty. In this known process of fractional digestion it was first proposed to divide the solubles into three groups and to firstly remove water soluble materials, such as starch, by treatment with hot or boiling water, secondly to treat the remaining material with a solution of caustic (or its equivalent) of a strength and at a temperature sufficient to effect the resolution of the pectose therein but to leave the lignins unaffected, and then thirdly and lastly to subject the remaining materials to a solution of caustic of a strength and at a temperature and pressure sufficient to effect the resolution of the lignins therein. In this original fractional separation process it was suggested to effect the resolution of the lignin using a solution of caustic having sufficient strength or free caustic therein to dissolve both the lignin of the third group and the pectose of the second group, and to use said same partially used up caustic solution thereafter to effect the resolution of the pectose from a fresh mass of material.

Subsequent practical experience apparently led to the conclusion that the above described separation into three groups was not necessary and in the fractional separation the first and second group were treated together care being taken, in extracting substances (such as starch) which are soluble in water and simultaneously those (such as pectose) which are soluble in a weak solution of caustic, only to use a solution sufficiently weak and at such a temperature as to prevent the caustic combining with the starch.

These resolutions were conducted in separate vessels superposed one above the other and with communicating pipes and valves whereby the material under treatment could be transferred from the upper to the lower vessel, the operation for the group comprising the starches and pectose being conducted in the upper vessel and of the lignin constituents in the lower vessel.

According to a later development of this fractional separation the upper superposed vessel is dispensed with and instead of transferring the material from one vessel to the other the liquor only is transferred from one to another of a set of digesting vessels placed side by side which work is series or rotation the stage or operation in each being in advance of the one next in series or rotation. The said fractional separation employing a single vessel or digester for both the high and the lower pressure digestions may be worked in connection with another set of vessels to which the contents of the first set are transferred, when the digestion processes are complete, for the purpose of leaching or washing the pulp free from the chemicals used and the resolution products formed in digestion by the well known diffusion method of leaching.

The fractional separation of the soluble or non-cellulosic constituents by the said known processes originally contemplated the resolution of the raw material separately in three steps or fractions in accordance with their differing degrees of solubility. In the practical application of these methods only two steps are generally considered desirable.

The process according to the present invention is based on the experimental evidence that the digestion of bamboo and other fibrous woody materials by the caustic or mixed caustic-sulphide method proceeds by a continuous extraction of the complex organic matters of a non-cellulosic nature. The rate of extraction or solution increases within limits with the strength of the free caustic and with the temperature and pressure and decreases with the increase in percentage of organic matter already in solution.

Thus the hitherto suggested sharp division of the non-cellulosic fibre encrusting substances into starches, pectoses, lignins etc. appears to be quite arbitrary and not in accord with the true facts. Solution of these substances takes place by imperceptible gradations and not be definite stages, and the process of digestion can be treated in a manner analogous to that employed in the many leaching and washing processes common to chemical industry.

In order to ensure maximum economy in time, energy, and materials these leaching processes in chemical industry are now carried out on the principle of reverse washing. The leaching or washing liquors are made to travel round a system in the opposite direction to the material to be washed, the virgin liquor meeting first with the almost completely washed material; the polluted liquor leaving the system at the point where the fresh unwashed material enters.

This principle is followed as closely as is practicable in the cascade process of digestion to be described. It will be evident that to apply this principle fully to the digestion of bamboo etc., some form of continuous digester would be necessary with a descending pressure-temperature gradient and a decreasing free-caustic concentration from the stock-exit point to the stock-entrance point.

Such an arrangement would involve many mechanical difficulties. These can be avoided without serious departure from the principle of the reverse washing process by using a number of digesters of medium size arranged in cascade fashion as described below.

The present invention comprises a process for the semicontinuous extraction or separation of cellulose or paper-pulp from bamboo, grasses, wood, reeds or other suitable fibre-yielding vegetable material, wherein the said material is treated in digesters with caustic or other digesting liquor, for example by the mixed caustic-sulphide or mixed caustic-sulphite method, using gradually increasing pressures and gradually increasing free caustic or digesting concentrations as one advances from the start to the finish of the digestion, in order to dissolve out and remove the complex organic matters of a non-cellulosic nature from the material, and which process is worked on the cascade or progressive system of digestion in a closed ring or cycle on the principle analogous to that known in the chemical industry as reverse washing, wherein the stock is loaded in turn into each digester in the ring and the stock in any one digester is subjected therein successively to a series of treatments with caustic or other liquor in successively increasing concentrations, each treatment being at a higher pressure and temperature than the last until the digestion is complete, and the stock or pulp, still in the same digester, is subsequently leached, preferably first with used and heated leaching liquor which has been used at least once before, and finally with one or more washes of water, the digester being then unloaded of its pulp and reloaded with a fresh charge of cellulose containing stock, characterized in that the caustic or other digesting liquor used in the digestion in any one digester with such non-cellulosic matter dissolved out and carried by the same is passed from that digester to the next-but-one digester in operative sequence under digestion in the cycle working at a lower pressure and lower free caustic or digestion liquor concentration.

The invention includes a process as last described, wherein the caustic or other digesting liquor which has been used in any one digester in the system is blown down, using the steam pressure in that digester for the purpose, into the next-but-one digester in operative sequence under digestion in the system working at a lower pressure and lower free caustic concentration.

It also includes such a process wherein the caustic or other digesting liquor from any one digester upon being blown down into the "next-but-one" digester in the cycle having a lower pressure and concentration is diluted or made up to the desired quantity to properly cover the greater volume of stock therein, if such make up is found necessary, by adding thereto liquid which has already been used for leaching or washing purposes in finished digesters one or more times, and hence is charged with appreciable quantities of caustic liquor and is more or less heated already.

In this process a preliminary treatment with water at raised temperature or boiling may be, and preferably is, introduced between the loading of a digester and the first treatment of the stock therein with caustic or other digesting liquor.

If preferred, between the loading of a digester and the first treatment of the stock therein with caustic or other digesting liquor at a pressure distinctly above the atmospheric, for example at 10 lbs. pressure, an intermediate treatment may be given using leaching or wash liquors which have already been used for washing out pulp contained in a digester in which digestion is complete, said leaching liquor thus being in a heated condition and carrying small amounts or traces of caustic or digesting reagents therewith, the said intermediate treatment being carried out at boiling point or under a slight steam pressure for example at 5 lbs. pressure.

The preliminary treatment with hot water or boiling water and a following intermediate treatment with a weak caustic liquor from the leaching washing phases of process may be combined.

The invention thus consists in a semi-continuous process for the separation or extraction of cellulose or paper-pulp from vegetable material containing the same, wherein a number of digesters (within limits the more the better) are used in a closed ring series of digesters, which are linked up and made to work in a continuous cycle, with, in the digestion portion of the cycle, increasing pressures and stronger free caustic or digesting liquor concentrations in any (and in each one in turn) of the digesters as the digestion of the stock progresses in the particular digester, characterized by the cycle of operations being so arranged that the caustic or digesting liquor and the steam pressure from any one digester, upon its digestion in that digester being suitably advanced, is transferred to another digester in the series which is the next-but-one lower in its stage of operation to the said digester in the pressure and liquor concentration series, or, in the case of the completion of the first treatment of stock in a digester with caustic or digesting liquor at pressure, (namely after the treatment at the lowest pressure and weakest digesting liquor concentration) is discharged to the caustic or other spent liquor recovery plant, or to other desired destination.

The said processes according to this invention may be adapted to continuously work on a step-down closed system with a descending pressure-temperature gradient and a decreasing free caustic concentration from the stock-exit point to the stock-entrance point, in the working of which double pipe ring connections are introduced for passing or blowing over the caustic or digesting liquors from one digester to another in the circle, each ring being connected to alternate digesters of the series, whereby partially used liquors may be blown over from any one digester to the next-but-one digester lower to it in the pressure-temperature-free-caustic-concentration gradient.

It should here be understood that by the "stock-exit" point we mean that end of the digestion operation where the digestion is complete and the stock or the pulp completely digested is ready for leaching, or washing and unloading; also that by stock entrance point we mean the point where the stock starts its actual digestion with caustic or digesting liquor under pressure, the stock will generally have been loaded previously to this and may have undergone a preliminary washing treatment or treatments.

A preferred manner of carrying out the process according to this invention will now be described with reference to the accompanying drawings in which:—

Fig. 1 is a diagram of a typical battery adapted to work in a ring or closed continuous circuit on the cascade principle.

Fig. 2 is a detail of the connections.

This system is shown employing a step-down pressure arrangement with an alternate ring series from the highest pressure digesters containing the strongest free caustic liquor—and almost completely leached stock—to the lowest pressure digesters with spent liquor and newly charged stock.

Figure 1 illustrates diagrammatically the arrangement with eight digesters in the cascade system Nos. 1—2—3 . . . 8 are the digesters with alternate ring pipe connections to ring mains $R^1$ and $R^2$.

Digester No. 1 is starting with bamboo or other fibrous material on its last stage of digestion under full pressure and with fresh strong caustic or other suitable digesting liquor supplied from the caustic or liquor tank C.

We will assume that 20% of the digestible material is removed at each stage of the digestion and that the last 20% still remains to be removed at the commencement of full pressure digestion in No. 1.

Similarly the material in digesters No. 2, 3, 4 and 5, is at the same time under extraction, No. 5 being at the lowest pressure and extracting the first 20% of digestible matter. No. 4 is under a higher pressure than No. 5 and is removing the second 20%, and so on.

When digestion in No. 1 is complete digester No. 2 is ready for its last extraction with clean fresh caustic. No. 3 digester is ready for its last-but-one digestion with only once used liquor i. e. with liquor from No. 1. Similarly No. 4 is ready for liquor from No. 2 and No. 5 for liquor from No. 3. No. 6 has in the meantime been loaded with fresh stock.

To operate the cycle between No. 4 and No. 6 the ring cocks 1 and 2 are opened and the liquor is blown over from No. 4 to No. 6. This is done by utilizing the pressure in No. 4 which is considerably higher than the pressure in No. 6 which latter will generally be open to atmosphere for the greater part of this step in the process. At the same time the waste cock 4 of No. 5 is opened and the liquor contained therein is blown out, using the residual pressure in No. 5, to the recovery through pipe 6. When the digester liquors have been completely blown over from Nos. 4 and 5 digesters the ring cock 1 of No. 6 and the waste liquor cock 4 of No. 5 are closed, but ring cock 2 is still left open and ring cocks 7, 8 and 9 of Nos. 2 and 3 and 5 are opened and the liquors blown over from Nos. 2 and 3 to Nos. 4 and 5 respectively. Cocks 2 and 9 of Nos. 4 and 5 are then closed and the ring cock 10 of No. 1 is opened and its liquor (ring cock 8 still remaining open) is blown over to No. 3 along with some make-up wash liquor from the wash-water tank $W^2$ by opening the corresponding wash-water cock 11. Make-up liquor can also be added in the same way to digesters Nos. 4 and 5 if necessary, to accommodate or completely cover the greater volume of the less digested stock.

At the same time fresh heated caustic is pumped or blown under pressure into digester No. 2 from the caustic tank C through pump 19 and cocks 12 and 7. No. 1 digester is now ready for its first wash. This is also pumped under pressure through pump 20, cocks 13 and 10 from the wash tank $w^1$ which contains the second wash or the first water wash of No. 8. This wash is then sent from No. 1 digester to tank $w^2$ through cocks 10 and 11 to be used subsequently as make up for No. 4 etc. No. 1 digester then receives its second wash or first water wash. The water is pumped from tank through pump 14, and cocks 15 and 10 and this wash liquor is sent to tank $W^1$ in readiness for the first wash of No. 2. The contents of digester No. 1 are now partly cooled owing to a good part of the heat locked up in the pulp having been extracted by the wash water sent on to tanks $W^2$ and $W^1$ respectively, the heating of which water adds to the economy of the system in that it reduces the call for live steam for make up purposes in digester No. 3. etc. The drain cock D is then opened and the contents of the digester are flushed with water and finally unloaded.

No. 8 has been unloaded and No. 7 loaded in the meantime in readiness for the next cycle of operations.

The two outer pipe rings $R^3$ and $R^4$ represent the recovery pipe and the steam pipe rings respectively. The recovery pipe 6 takes spent liquor from the first extraction to the recovery plant via an economizer if desired. The steam pipe ring $R^4$ supplied steam to the digesters as required to keep them up to their respective digestion pressures. Let us assume that the process is working on bamboo and that the final digestion in No. 1 digester has been carried out at 100 lbs. pressure (170° C.). No. 3 digester has finished its third or last-but-two digest at 60 lbs. pressure (153° C.) and has blown its liquor over to No. 6. The residual pressure in the digester No. 3 is say 25 lbs. (130° C.). No. 1 liquor is blown into it with the result that the pressure in No. 1 drops say to 60 lbs. and that in No. 3 rises to 50 lbs. (148° C.). After closing No. 3 live steam is introduced from steam ring $R^4$ through cock 16 into No. 3 digester by opening this steam cock sufficiently long to bring the pressure up to the desired amount viz 80 lbs. (162° C.) and additional steam is supplied if desired to keep up this pressure over the extraction period.

It is of course understood that the pressures indicated above for bamboo may themselves be widely varied and are only given by way of illustration and may be modified to suit the optimum conditions for the particular kind of fibrous material undergoing digestion and for the kind of digester liquor used.

In the above description of the operation of a cycle, it has been assumed for simplicity that the connection to the digesters from the alternate ring pipe systems $R^1$ and $R^2$ was made to the bottom of each digester via a single valve. Thus in "blowing over" a digester the liquor would pass from the bottom of the one digester to the bottom of the other.

In actual practice and if using the Sinclair type of digesters (which is one having internal vomit pipes) the "blow over" would be more effective if made to proceed from the bottom of the blow-off digester to the top of the receiving digester.

This result readily is obtained by means of a branch connection from the ring pipe system $R^1$ or $R^2$ to the top and bottom of each digester, with a valve, 17 and 18, in each branch as shown in Figure 2.

If digester A (Fig. 2) for example is blowing liquor over to another digester the lower cock 18 would be opened to the pipe ring $R^1$ (or $R^2$ as the case might be) and the upper one 17 closed, while if receiving liquor from another digester, the upper cock 17 would be opened and the lower one be closed.

It is generally desirable to precede the treatment of the stock with caustic by a treatment with boiling water, because by such treatment caustic will be economized owing to said hot water dissolving out the water soluble constituents in the stock which would otherwise consume a portion of the digesting reagent. In this cascade system this preliminary washing is easily effected as will readily be apparent. All that is necessary is to concentrate the washing, unloading and leading operations in digesters Nos. 8 and 7 instead of in three digesters Nos. 8, 7 and 6 as before described. By this means digester No. 6 is available for a preliminary treatment with hot water to dissolve out the water soluble constituents before it receives its first charge of nearly spent caustic liquors from No. 4. The water for washing out No. 6 may be obtained from wash water tanks $W^1$ or $W^2$ and would thus be more or less heated already. More water and further wash water tanks would in that case be used in washing Nos. 1 and 8 than otherwise in order to supply extra water in these two tanks $W^1$ and $W^2$ not only for use as make up liquor for digesters Nos. 3, 4 and 5 but also to supply the water for No. 6. The water for the preliminary treatment of digester No. 6 might however be supplied from tank W or from other source, and the same be heated up to the required temperature in No. 6 by admitting live steam through cock 21 from the steam ring $R^4$.

From the above description of the process and a consideration of the diagram, it will be evident that the cascade system of extraction with a double ring can be arranged with any even number of digesters from four upwards. In most plants eight or ten digesters will be the preferred number.

The proportional number of digesters under extraction out of the total number in the cascade system can also be varied from two or three upwards, as may be found necessary to meet the requirements of the particular material to be digested.

Similarly, the number of digesters in the washing, unloading, and loading and preliminary treatment with water sections of the cascade system can be regulated to suit the conditions of the particular operation in each case. The desideratum will be that any particular operation in the cycle should not be responsible for a hold up in the continuous uninterrupted operation of the system. Thus, with hydraulic or other mechanical methods of unloading, one digester in the unloading section of the system would probably be sufficient; whereas with hand unloading and the prolonged cooling period which would be necessary, two, or even three digesters might be required in the cooling and unloading section of the system.

For some types of fibre such as bamboo it may also be found advantageous to lay more stress on the preliminary treatments and to give the raw material both a preliminary hot water wash or/and a boil with very weak alkali solution. The insertion of a one or more digesters, in the cycle between the loading digester No. 6 and the 1st extraction digester No. 5 (using liquor) would provide for this and the earlier washes from the finished digester No. 1 could be collected for a weak alkali boil if this was found to be necessary whilst the water from the last wash of all in No. 8 might be used for the preliminary hot water extraction.

The advantages of the cascade system include, it is believed, amongst others the following:—

(A) This system will give the most complete extraction for any particular fibre with a minimum consumption of digestion chemicals since the digester liquor acts progressively on the fibre by the well known principle of reverse washing and the number of digesters in the extraction section of the cycle can be suited to the fibre under digestion.

(B) The digested pulp will be of maximum yield and highly uniform in quality since it has been subjected to several short digests with different liquors of increasing liquor concentration and pressure.

The process will tend automatically to eliminate irregularities in the cocks.

(C) The pulp will be easily bleached since the maximum extraction possible for a given caustic consumption per ton of fibre is obtained.

(D) The liquor volume per ton of fibre digested is brought to a minimum since each extraction in the cycle can be arranged to have the minimum liquor volume for that particular extraction, and only spent digester liquor goes to the evaporators.

(E) The recovery of soda in the spent lye will be a maximum, since the washes are used to dilute the strong caustic liquor of the final digest to the volumes necessary for the preceding digests.

(F) The steam consumption will be a minimum since the bulk of the heat contents of one digester is directly transferred (with the liquor) to a digester lower in the pressure-temperature cycle, and the heat carried away in the water washes also is completely utilized in that the heated wash water makes up the liquor volume needed for the weaker caustic digestions or for the preliminary treatments.

(G) The time taken for carrying out the complete cycle will be a minimum for the best extraction since the cycle is adjusted to the optimum conditions for the particular fibre.

It will of course be understood that, although the process has been described in relation to a particular lay-out of plant which I have found convenient, it is not by any means restricted in its application to the particular plant referred to, as it will be obvious that, given suitable piping, trunks, connections and valves, the process could be worked with very different arrangements of plant. The plant actually described moreover may be modified by introducing extra piping tanks and pumping means if it is desired to develop the washing and preliminary treatment parts of the process.

In the foregoing description and in the appended claims by the term "next-but-one" it is not intended to mean the next-but-one in actual physical position, but instead the next-but-one in its stage of operative sequence under digestion. For example, considering one side of the double ring system (and it is to be observed that the process is not restricted to a double ring system only but may be used with a single ring if desired) it will be seen that the liquor from the final digestion, say at 100 lbs. pressure, is blown down into what is physically the next digester connected to that ring. It is however not the next one in the stage of operative sequence under actual digestion for it is into the digester at 60 lbs. that the one at 100 lbs. is blown down, and this digester (at 60 lbs.) is not the next one in operative sequence but the next-but-one in operative sequence, because it is only after the blowing over from the digester at 100 lbs. is completed and a further adjustment of pressure (for example by introducing live stem) has taken place that the said digester recently at 60 lbs. becomes the "next" digester in operative sequence at 80 lbs. pressure.

It will be noted that this statement "next-but-one in operative sequence under digestion" envisages that the digestion is to be carried out in three or more stages.

It will be further noted that the phrase is to be understood to be applied to the operative part of the process wherein it is applicable. For example, it is obvious that when we consider the digester the first digestion in which is just completed it is not possible to transfer the liquors in the manner indicated to other digesters, but the same will be transferred to the liquor recovery plant.

It is further to be understood that when in this specification and in the claims appended thereto "an increasing (or a decreasing) pressure and free-caustic or liquor concentration" is referred to, the statement is not to be taken too literally but is merely a general statement, and that the scope of the invention is not to be avoided by making minor alterations in such a system of working, for example by working the two final stages of the operation at the same pressure or by working two of the digestions with approximately the same free caustic concentration. The said statement is intended to refer to the general trend of the cycle of operations wherein both the pressure and concentration is low in the initial stages and rises, roughly in steps, until it is high in the final stages of the digestion.

Having now particularly described and ascertained the nature of my said invention and in what manner the same is to be performed, I declare that what I claim is:—

1. A process for the extraction of cellulose from materials containing the same comprising, providing a plurality of digesters, charging the digesters with cellulose material to be extracted, introducing digesting liquor into one of the digesters and thereby dissolving at least a part of the soluble matter in the material, removing the resulting liquor and subsequently introducing liquor of greater concentration and of higher temperature and under greater steam pressure into that digester, and continuing such processes utilizing liquors of greater concentration, heat and pressure at each stage, effecting the removal of the digesting liquor from one such digester and its introduction into the next digester in sequence by blowing down the liquor by means of the steam, and utilizing the partially spent liquor from each stage in similar extractions of the less extracted materials in another digester, whereby the most extractive liquor is applied to the material most completely extracted.

2. A process for the extraction of cellulose from materials containing the same comprising, providing a plurality of digesters, charging the digesters with cellulose material to be extracted, subjecting the material in one digester to a preliminary treatment with water at elevated temperature to effect at least partial extraction of water-soluble substances, removing the solution so obtained, introducing digesting liquor into that digester and thereby dissolving at least a part of the material soluble in the liquor, removing the resulting liquor and subsequently introducing liquor of greater concentration and of higher temperature and pressure into that digester, and continuing such process of treatment with digesting liquor utilizing liquors of greater concentration, heat and pressure at each stage, utilizing the partially spent liquor from each stage in similar extractions of the less extracted materials in another digester, whereby the most extractive liquor is applied to the material most completely extracted.

In testimony whereof I hereto affix my signature this 11th day of January, 1928.

EDMONDSON SPENCER.